(12) United States Patent
Martin

(10) Patent No.: US 11,794,628 B1
(45) Date of Patent: Oct. 24, 2023

(54) DEVICE AND METHOD FOR PROVIDING A FLEXIBLE STRAP FOR TIGHTENING CARGO

(71) Applicant: Grant W. Martin, Santa Clarita, CA (US)

(72) Inventor: Grant W. Martin, Santa Clarita, CA (US)

(73) Assignee: Seventeen Solutions, LLC, Valencia, CA (US)

( * ) Notice: Subject to any disclaimer, the term of this patent is extended or adjusted under 35 U.S.C. 154(b) by 0 days.

(21) Appl. No.: 17/830,085

(22) Filed: Jun. 1, 2022

(51) Int. Cl.
*B60P 7/08* (2006.01)

(52) U.S. Cl.
CPC .................... *B60P 7/0838* (2013.01)

(58) Field of Classification Search
CPC ... B60R 7/0838; Y10T 24/316; Y10T 24/318; Y10T 24/2175; Y10T 24/2191; B60P 7/0838
See application file for complete search history.

(56) References Cited

U.S. PATENT DOCUMENTS

| | | | | |
|---|---|---|---|---|
| 1,696,220 A | * | 12/1928 | Townsend | B60J 11/00 24/301 |
| 5,224,247 A | | 6/1993 | Collier | |
| 5,402,557 A | * | 4/1995 | Dalen | B60P 7/0823 24/301 |
| 7,343,648 B2 | * | 3/2008 | Shaw | B60P 7/0823 24/71 TD |
| 7,458,135 B2 | * | 12/2008 | Mikesell | B25H 3/006 24/301 |
| 8,997,317 B2 | * | 4/2015 | Rinklake | A62B 35/04 24/301 |
| 9,797,431 B1 | | 10/2017 | Cornay | |
| 10,174,784 B1 | | 1/2019 | Cornay | |

* cited by examiner

*Primary Examiner* — Robert Sandy
(74) *Attorney, Agent, or Firm* — Vincent G. Lotempio

(57) ABSTRACT

Embodiments herein illustrate a cargo strap tightening device. The cargo strap tightening device includes a buckle assembly that comprises a strap webbing. The cargo strap tightening device includes a spring having high tension. Each end of the spring being coupled to the buckle assembly. Further the cargo strap tightening device includes at least two hook and loop connecting points and at least two shrink tubes to fasten the buckle assembly. The at least two shrink tubes are used to fasten the ends of the spring and the strap webbing when heat is applied on the shrink tubes. Furthermore, the cargo strap tightening device includes a protective sleeve to cover the spring.

20 Claims, 11 Drawing Sheets

DEVICE AND METHOD FOR PROVIDING A FLEXIBLE STRAP FOR TIGHTENING CARGO

TECHNICAL FIELD

The presently disclosed embodiments are related, in general, to tie-downs for use in shipping. More particularly, the presently disclosed embodiments are related to device and method for providing a flexible strap for securing objects during transportation.

BACKGROUND

Currently, the transport of cargo via trucks or freight containers is fraught with safety risks for the operator and results in a high volume of damaged objects being delivered to the consignee. Tie-downs/cargo straps are tensioned constantly in the transportation of objects. Generally, tension is achieved by way of a ratcheting device. However, most users find confusing, prone to jamming and prone to failure in using ratcheting devices. Ratcheting devices are also prone to over tensioning as users cannot use their sense of touch in a manner that allows them to judge tension, resulting in damaged cargo during transportation of the objects. Flexible cord type straps (bungee) are dangerous and lack proper tension, furthermore, they lack a safe means of releasing tension. Lashing straps or cam-buckle pull straps lack the ability to expand and flex a spring portion, resulting in a loss of tension if the cargo load sinks or shifts.

Attempts have been made to create auxiliary devices such as U.S.4842236A by Yonts, with a spring apparatus that is not intended to create a tightening method of simply pulling. Similar devices have been created like U.S.10086745 by Gill, and U.S.5402557 by Dalen, which have an elastic portion but lack the spring tension and ability to allow users a pull-to-tighten option. Prior attempts at cargo straps with a flexible portion have required unreliable or expensive mechanical connections, resulting in high retail cost, and not allowing most users to afford safe and simple devices.

Applicant has identified several deficiencies and problems associated with conventional methods of transportation of the objects, and other associated systems, as described above. Through applied effort, ingenuity, and innovation, many of these identified problems have been solved by developing solutions that are included in embodiments of the present disclosure, many examples of which are described in detail herein.

SUMMARY

Consequently, there is a need for an improved method and device for providing a flexible strap for securing objects during transportation that alleviates at least some of the above cited problems.

It is therefore an object of the present disclosure to provide a cargo strap tightening device and a method for providing a means for tightening a cargo using a strap, alleviate, or eliminate all or at least some of the above-discussed drawbacks of presently known solutions.

This and other objects are achieved by means of a cargo strap tightening device and a method as defined in the appended claims. The term exemplary is in the present context to be understood as serving as an instance, example or illustration.

Embodiments of the present disclosure relate to a cargo strap tightening device. The cargo strap tightening device comprises a buckle assembly that comprises a strap webbing. The cargo strap tightening device comprises a spring having high tension. Each end of the spring being coupled to the buckle assembly. The cargo strap tightening device further comprises at least two hook and loop connecting points and at least two shrink tubes to fasten the buckle assembly. The at least two shrink tubes are used to fasten the ends of the spring and the spring limiter when heat is applied on the shrink tubes. The cargo strap tightening device further comprises a protective sleeve to cover the spring.

In an embodiment, the buckle assembly comprises strap webbing and the strap webbing is folded and sewn in S shape to form at least two loops.

In an embodiment, the spring comprises a hook on each side of the spring and the hook of the spring is attached into the loops of the strap webbing.

In an embodiment, the strap webbing has a loose end for a user to pull the cargo strap tightening device to expand and tighten the spring.

In an embodiment, the protective sleeve is comprised of nylon material or poly blend tubular textile to protect the spring.

In an embodiment, the at least two shrink tubes are shrunk around the connection point of hook and loop to fasten the buckle assembly.

In an embodiment, the cargo strap tightening device further comprises a cam-lock buckle coupled with the buckle assembly to provide mechanical advantage to tighten the spring.

In an embodiment, the spring is flexible and expandable to tighten the cargo.

In an embodiment, the buckle assembly does not comprise a ratcheting device to gain a tension to the cargo.

In an embodiment, the spring is attached with the strap webbing such that a portion of the strap webbing works as a spring limiter.

In an embodiment, the spring limiter is longer than the spring when the spring is not expanded.

In an embodiment, the spring limiter prevents the spring from exceeding a maximum predetermined length in an event of over-flex condition.

Embodiments of the present disclosure relate to a method for providing a means for tightening a cargo using a strap. The method comprises folding and sewing a continuous strap webbing to form at least two loops at a buckle assembly by using box stitching. The method comprises attaching at least two hooks of a spring to the loops of the strap webbing using at least two hook and loop connecting points. The method further comprises placing at least two shrink tubes over the webbing strap. The at least two shrink tubes are used to fasten the ends of the spring and the strap webbing when heat is applied on the shrink tubes. The method further comprises placing a protective sleeve to cover the spring.

In an embodiment, the method comprises providing secure attachment points in the webbing strap through the at least two loops sewn in S shape.

In an embodiment, the method comprises forming the at least two hooks of the spring that assemble with the at least two hook and loop connecting points.

In an embodiment, the at least two shrink tubes are placed to fasten the at least two hooks and the at least two loops without mechanical device or coupling.

In an embodiment, the strap webbing has a loose end for a user to pull the cargo strap tightening device to expand and tighten the spring.

In an embodiment, the protective sleeve is comprised of nylon material or poly blend tubular textile to protect the spring.

In an embodiment, the spring is flexible and expandable to tighten the cargo.

In an embodiment, the spring is attached with the strap webbing such that a portion of the strap webbing works as a spring limiter. The spring limiter is longer than the spring when the spring is not expanded.

In an embodiment, the method further comprises preventing, by the spring limiter, the spring from exceeding a maximum predetermined length in an event of over-flex condition.

In an embodiment, any of the above aspects may additionally have features identical with or corresponding to any of the various features as explained above for any of the other aspects.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

An advantage of some embodiments is that alternative and/or improved approaches are provided for transportation of the cargo.

An advantage of some embodiments is that alternative and/or improved approaches are provided for a safe means of releasing tension.

An advantage of some embodiments is that the cargo straps are provided with a flexible portion that requires reliable or inexpensive mechanical connections An advantage of some embodiments is that the cargo straps are provided with a flexible portion that results in low retail cost, and allowing most users to afford safe and simple devices.

BRIEF DESCRIPTION OF DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
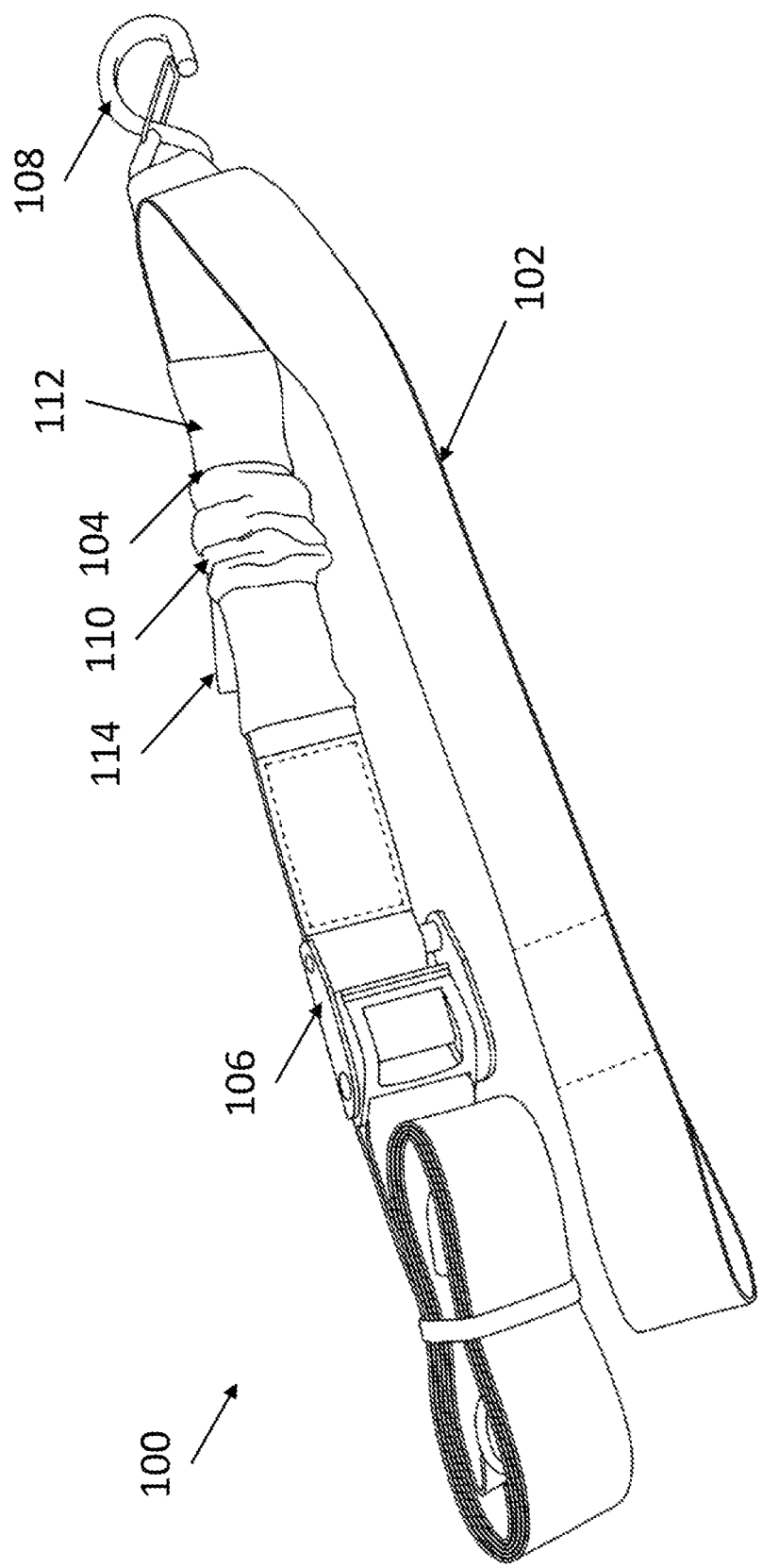
FIG. 1 illustrates a schematic diagram of a cargo strap tightening device, according to one or more embodiments illustrated herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout. Terminology used in this patent is not meant to be limiting insofar as devices described herein, or portions thereof, may be attached or utilized in other orientations.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

Embodiments of the present disclosure will be described and exemplified more fully hereinafter with reference to the accompanying drawings. The solutions disclosed herein can, however, be realized in many different forms and should not be construed as being limited to the embodiments set forth herein.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of." As used herein, the singular forms "a", "an" and "the" are intended to include the plural forms as well, unless the context clearly indicates otherwise.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

FIG. 1 illustrates a schematic diagram of a cargo strap tightening device 100, according to one or more embodiments illustrated herein. The cargo strap tightening device 100 includes a strap webbing 102, a spring 104, a buckle assembly 106 and one or more hooks 108. The hook 108 is used to attach the cargo strap tightening device 100 to an anchor while transporting the cargo. For example, the cargo strap tightening device 100 includes two hooks on each end of the strap webbing 102. Each hook can be attached to the corresponding anchor during the transportation of the cargo.

The cargo strap tightening device 100 according to the present embodiment includes the spring 104 coupled to the buckle assembly 106. The spring 104 has high tension to provide support to the cargo for preventing the cargo from unnecessary movement. Each end of the spring 104 includes hook which can be attached to loops formed by the strap webbing 102. For example, the cargo strap tightening device 100 comprises at least two hook and loop connecting points and at least two shrink tubes 112 to fasten the buckle assembly 104. The ends of the spring 104 is attached to the corresponding hook and loop connecting points to fasten the buckle assembly. The at least two shrink tubes 112 are used to fasten the ends of the spring 104 when heat is applied on the shrink tubes 112. The cargo strap tightening device 100 comprises a spring limiter 114 having at least two ends. Each of the ends of the spring limiter 114 is coupled to the buckle assembly 106. The cargo strap tightening device 100 comprises a protective sleeve 110 to cover the spring 104. The protective sleeve 110 is comprised of nylon material or poly blend tubular textile to protect the spring 104. Further, the strap webbing 102 has a loose end for a user to pull the cargo strap tightening device 100 to expand and tighten the spring 104. The method of assembly of the cargo strap tightening device 100 is described in FIGS. 2-10.

Figure 2:
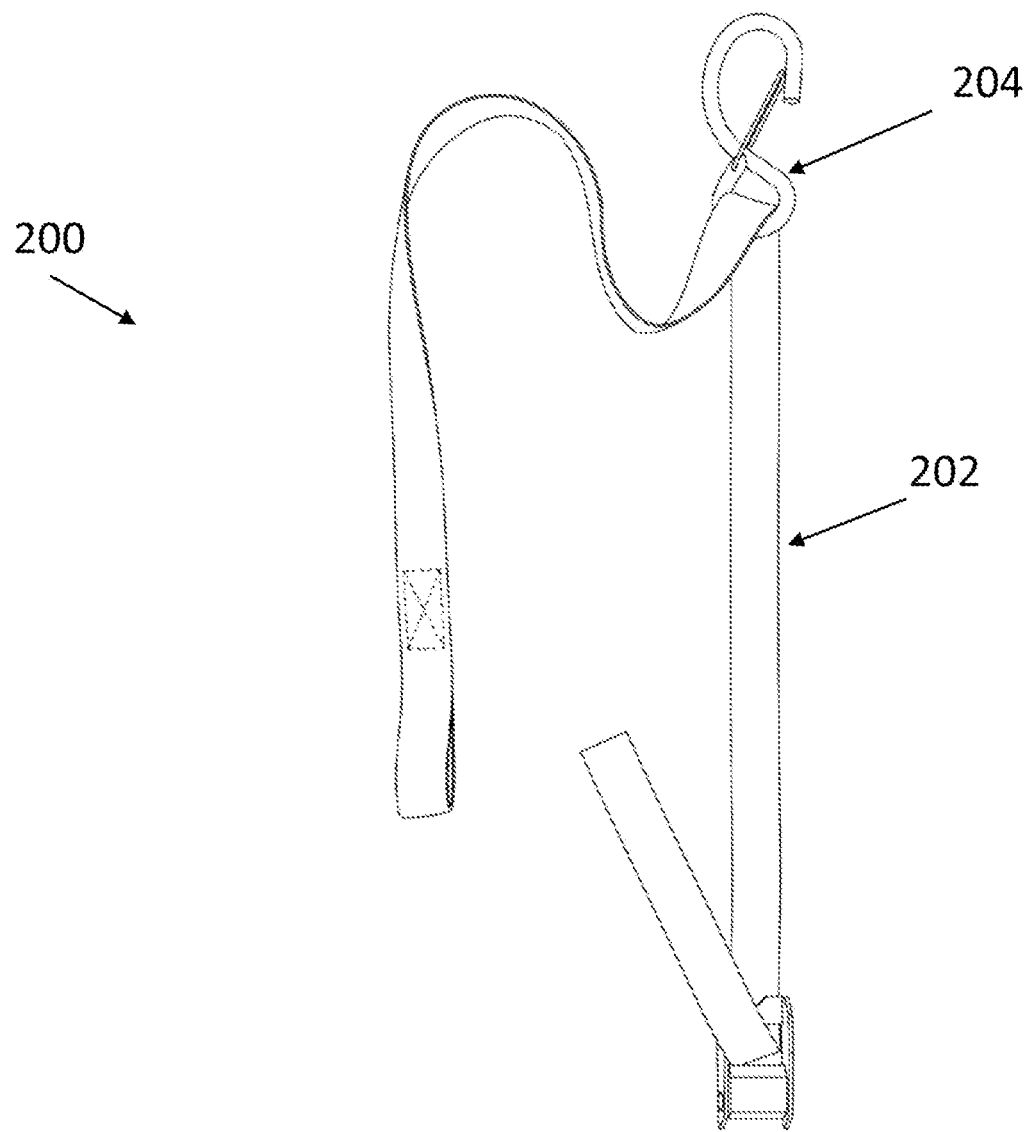
FIG. 2 illustrates a schematic diagram of sewing the continuous strap webbing, according to one or more embodiments illustrated herein.

FIG. 2 illustrates a schematic diagram of sewing the continuous strap webbing 202, according to one or more embodiments illustrated herein. In an example embodiment, the strap webbing 202 is continuously extended from the buckle to the hook 204. Further, the strap webbing 202 is sewn to be attached to the hook 202. The sewing of the strap webbing 202 has been done by one of the various methods used for sewing the strap webbing 202.

Figure 3:
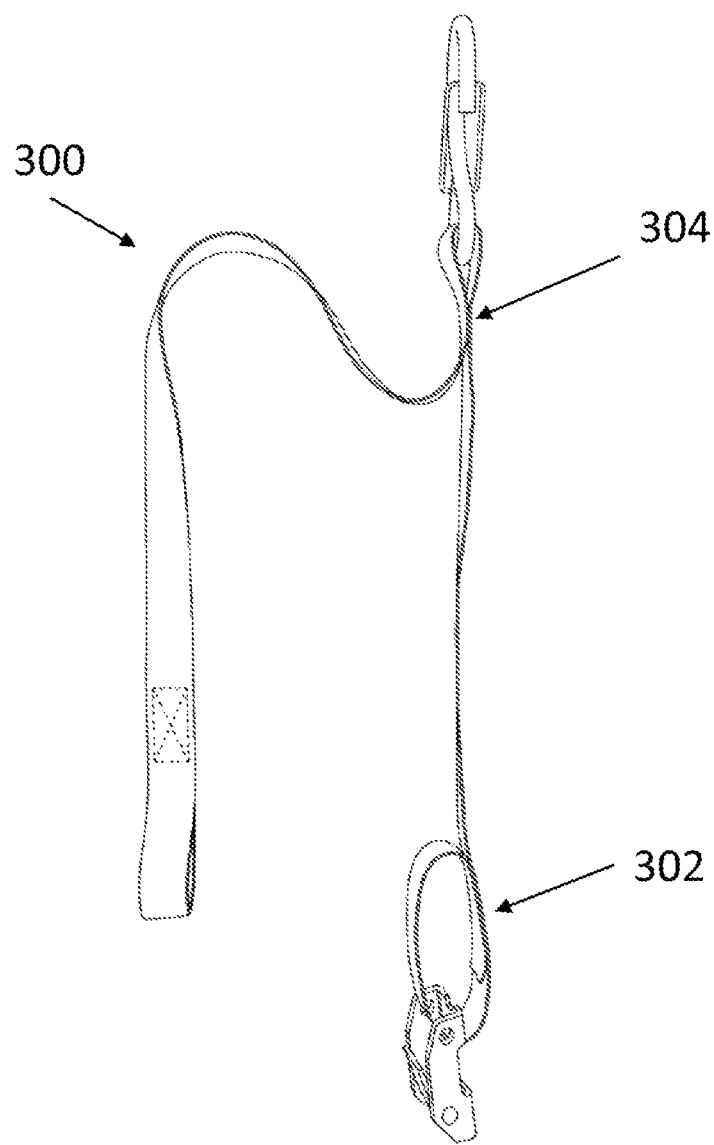
FIG. 3 illustrates a schematic diagram of folding the continuous strap webbing, according to one or more embodiments illustrated herein.

FIG. 3 illustrates a schematic diagram of folding the continuous strap webbing, according to one or more embodiments illustrated herein. In an embodiment, the strap webbing is folded around the hook and the buckle to form folds. For example, a first end of the strap webbing is folded around the hook to form a fold 302 and a second end of the strap webbing is folded around the buckle to form a fold 304.

Figure 4:
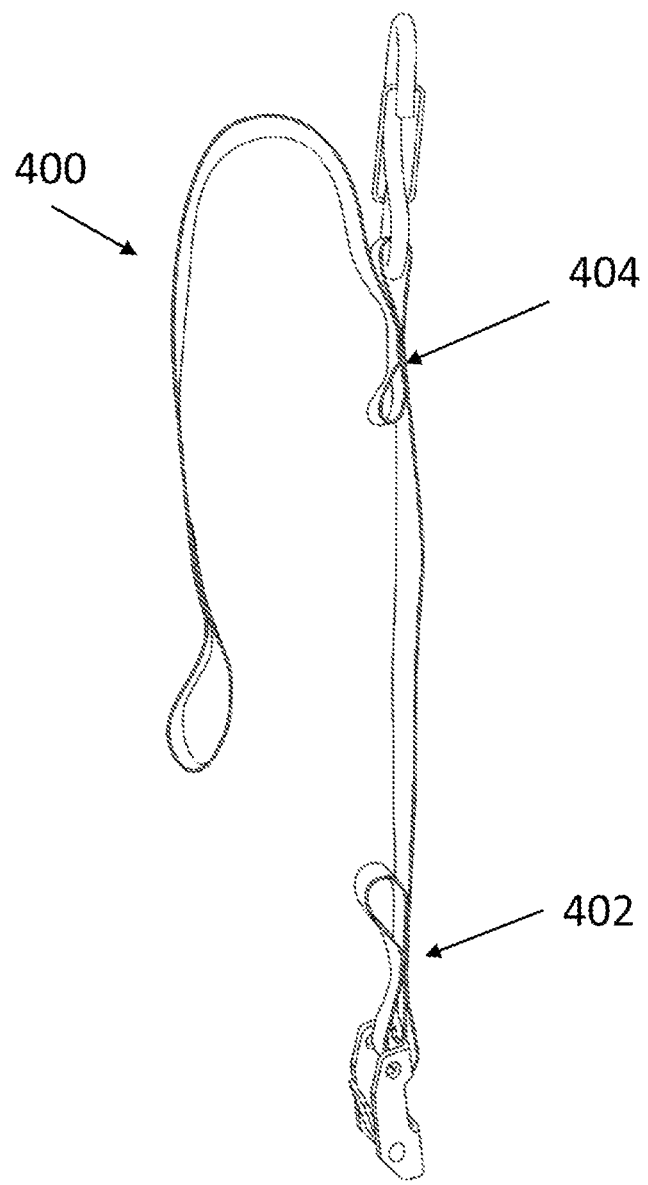
FIG. 4 illustrates a schematic diagram of folding the continuous strap webbing to form loops, according to one or more embodiments illustrated herein.

FIG. 4 illustrates a schematic diagram of folding the continuous strap webbing to form loops, according to one or more embodiments illustrated herein. In an embodiment, the strap webbing is folded around the hook and the buckle to form loops. For example, the first end of the strap webbing is again folded to form a loop 402 and a second end of the strap webbing is again folded around the buckle to form a loop 404. The loops 402 and 404 are used to attached with hooks of the spring to couple the spring with the buckle assembly.

Figure 5:
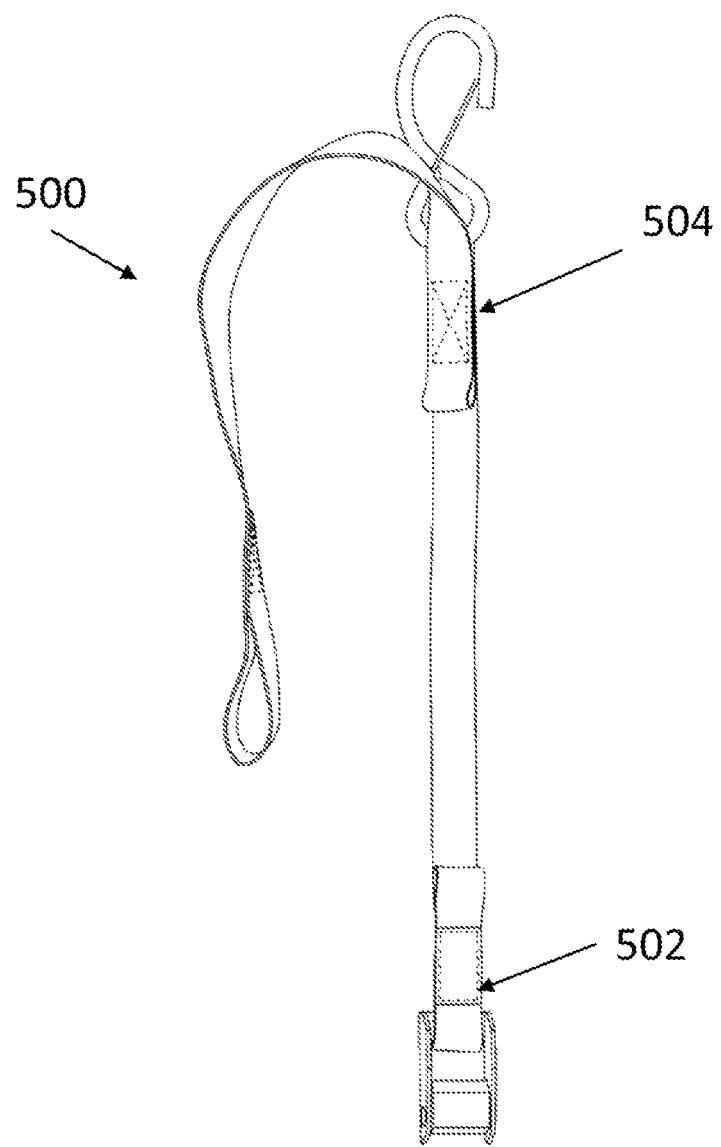
FIG. 5 illustrates a schematic diagram of stitching the strap webbing, according to one or more embodiments illustrated herein.

FIG. 5 illustrates a schematic diagram of stitching the strap webbing, according to one or more embodiments illustrated herein. In an embodiment, the loops, formed by the strap webbing as illustrated in FIG. 4, are being stitched to fix the loops. The stitch is provided using one of the methods for stitching. In an example, the box type stitching is provided on the strap webbing. For example, the loop around the buckle is provided with the box stitch 502 and the loop around the hook is provided with the box stitch 504.

Figure 6:
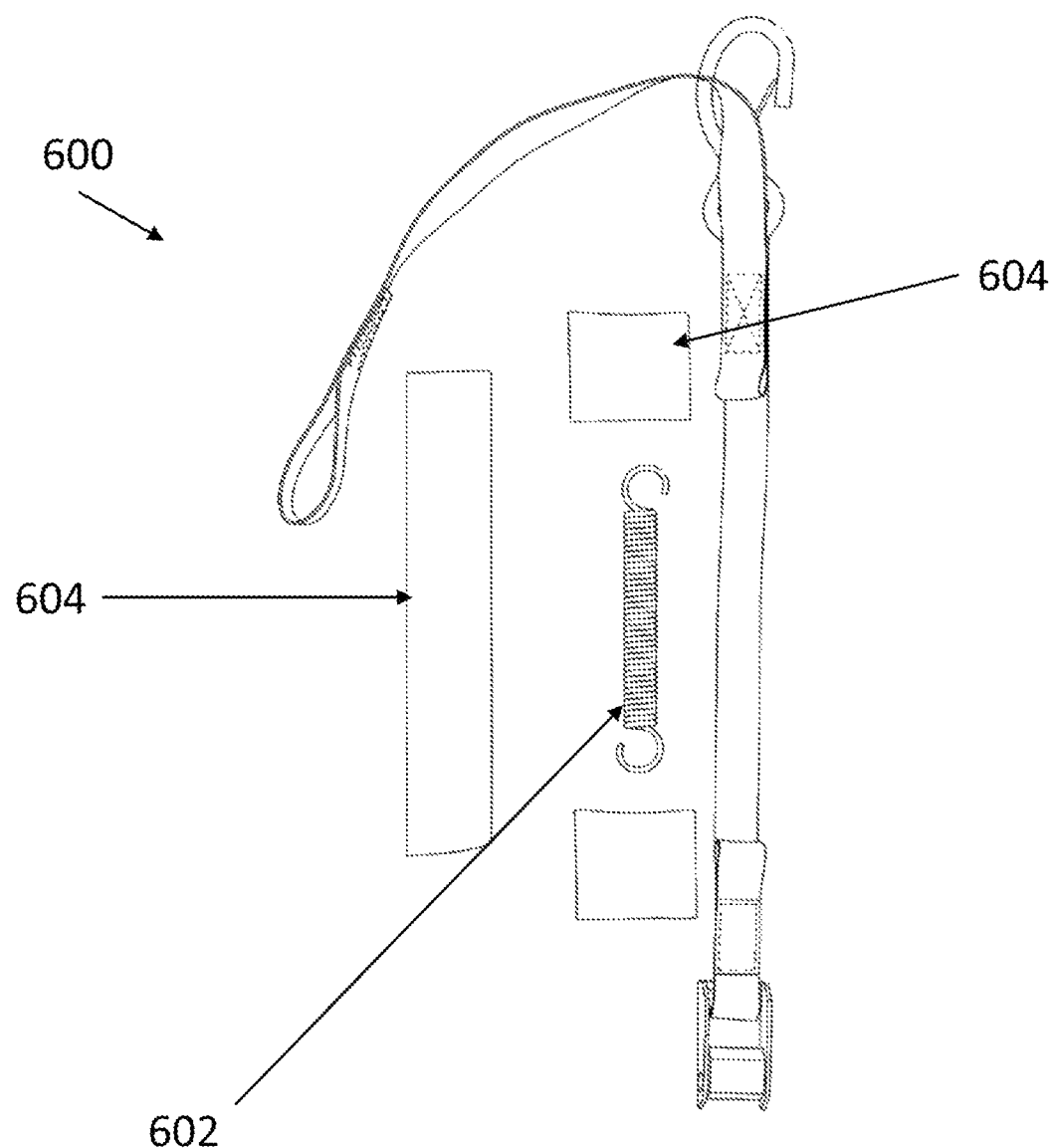
FIG. 6 illustrates a schematic diagram of the components of the cargo strap tightening device, according to one or more embodiments illustrated herein.

FIG. 6 illustrates a schematic diagram of the components of the cargo strap tightening device, according to one or more embodiments illustrated herein. In an embodiment, the cargo strap tightening device includes the spring 602, the shrink tubes 604 and the protective sleeve 606.

Figure 7:
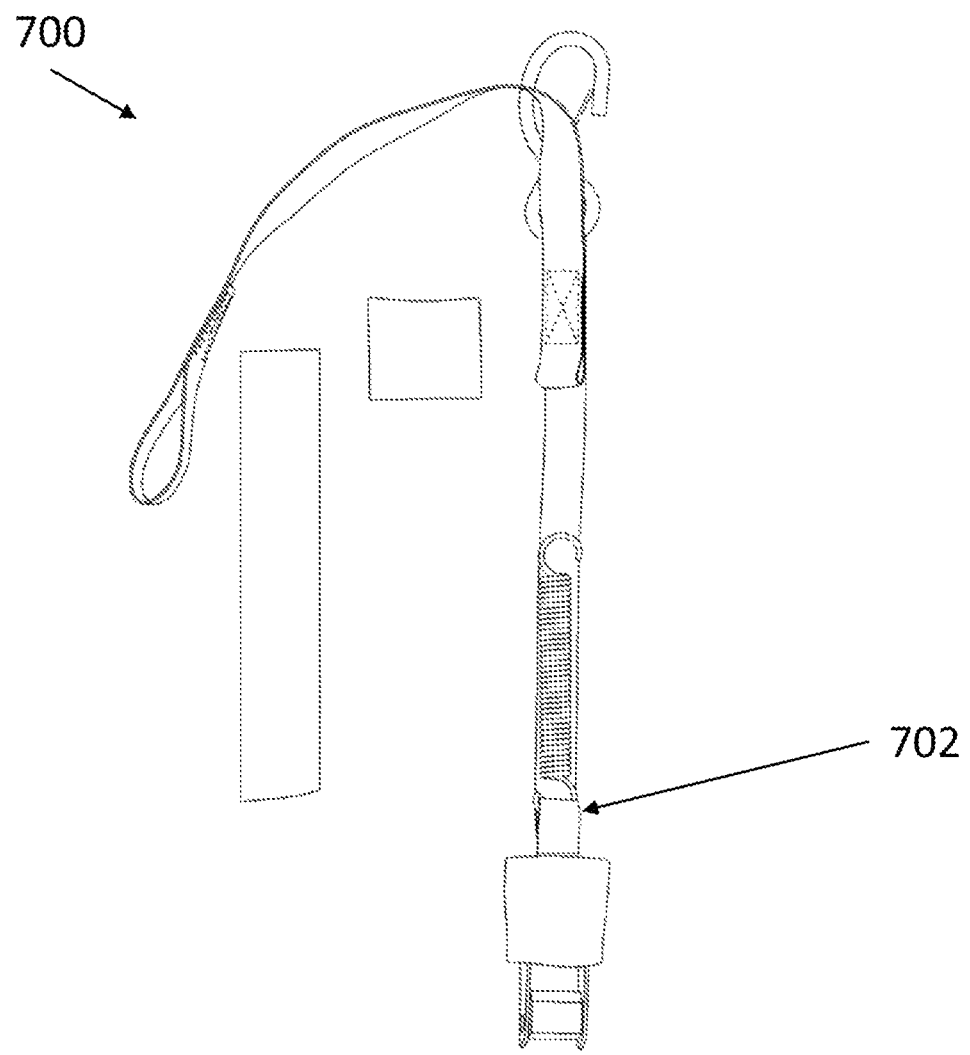
FIG. 7 illustrates a first schematic diagram of assembling the components of the cargo strap tightening device, according to one or more embodiments illustrated herein.

FIG. 7 illustrates a first schematic diagram of assembling the components of the cargo strap tightening device, according to one or more embodiments illustrated herein. In an embodiment, the spring comprises hooks at each end. Firstly, the hook of one end of the spring is attached with one loop formed by the strap webbing as illustrated in 702.

Figure 8:
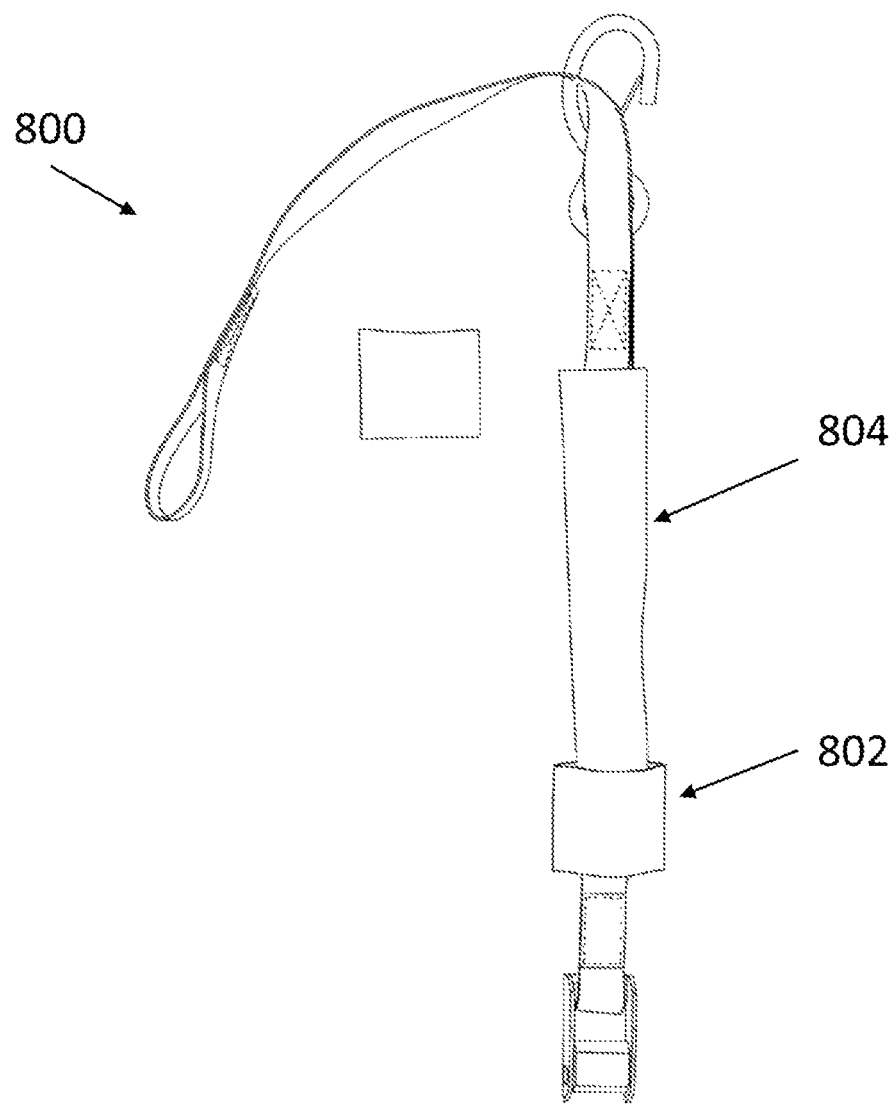
FIG. 8 illustrates a second schematic diagram of assembling the components of the cargo strap tightening device, according to one or more embodiments illustrated herein.

FIG. 8 illustrates a second schematic diagram of assembling the components of the cargo strap tightening device, according to one or more embodiments illustrated herein. In an embodiment, one of the shrink tubes is placed around the hook and loop connecting points as illustrated in 802. Further, the heat is applied on the shrink tube 802. The shrink tube 802 shrinks when the heat is applied. Thus, the shrink tube 802 shrunk around the connection point of hook and loop to fasten the buckle assembly. Further, the protective sleeve is placed over the spring as illustrated in 804. Furthermore, hook of another end of the spring is attached with corresponding loop formed by the strap webbing.

Figure 9:
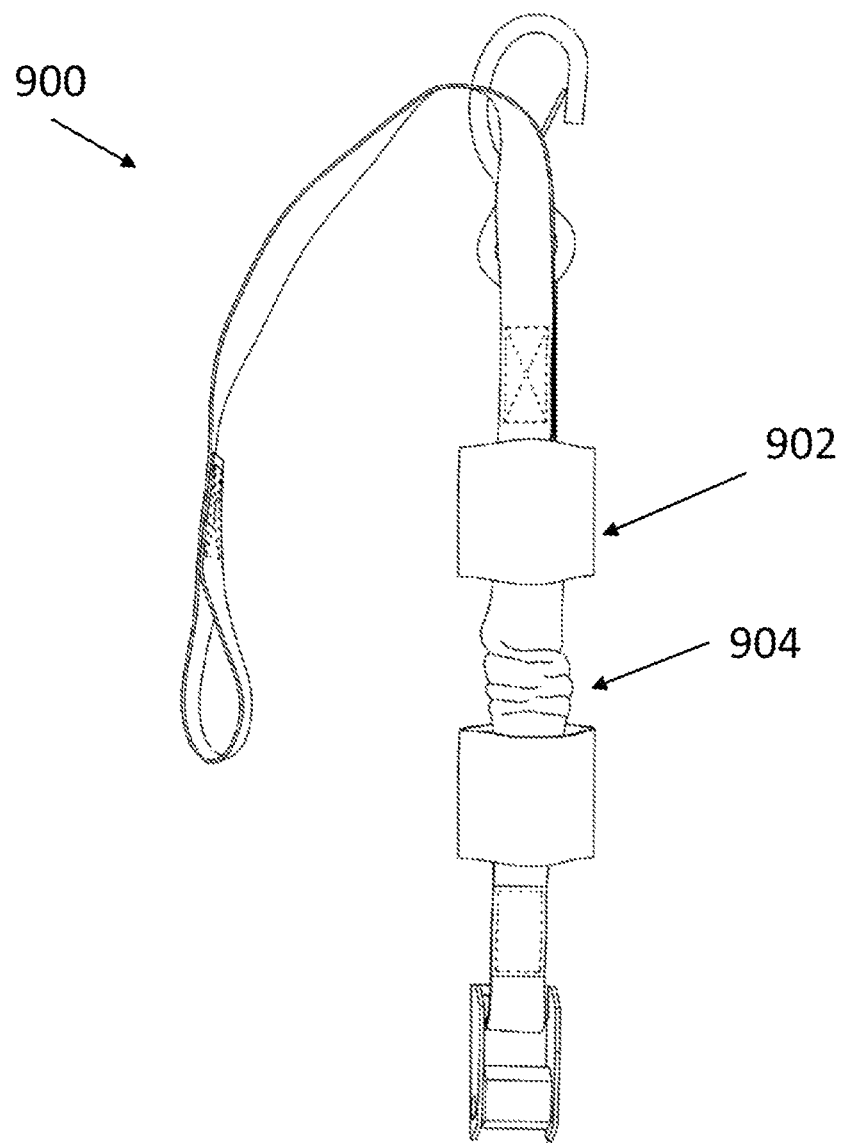
FIG. 9 illustrates a third schematic diagram of assembling the components of the cargo strap tightening device, according to one or more embodiments illustrated herein.

FIG. 9 illustrates a third schematic diagram of assembling the components of the cargo strap tightening device, according to one or more embodiments illustrated herein. In an embodiment, another shrink tube is placed around the hook and loop connecting points. Further, the heat is applied on the shrink tube. The shrink tube shrinks when the heat is applied as illustrated in 902. Thus, the shrink tube shrunk around the connection point of hook and loop to fasten the buckle assembly. Furthermore, the heat is applied of the protective sleeve. The protective sleeve shrinks when the heat is applied as illustrated in 904.

Figure 10:
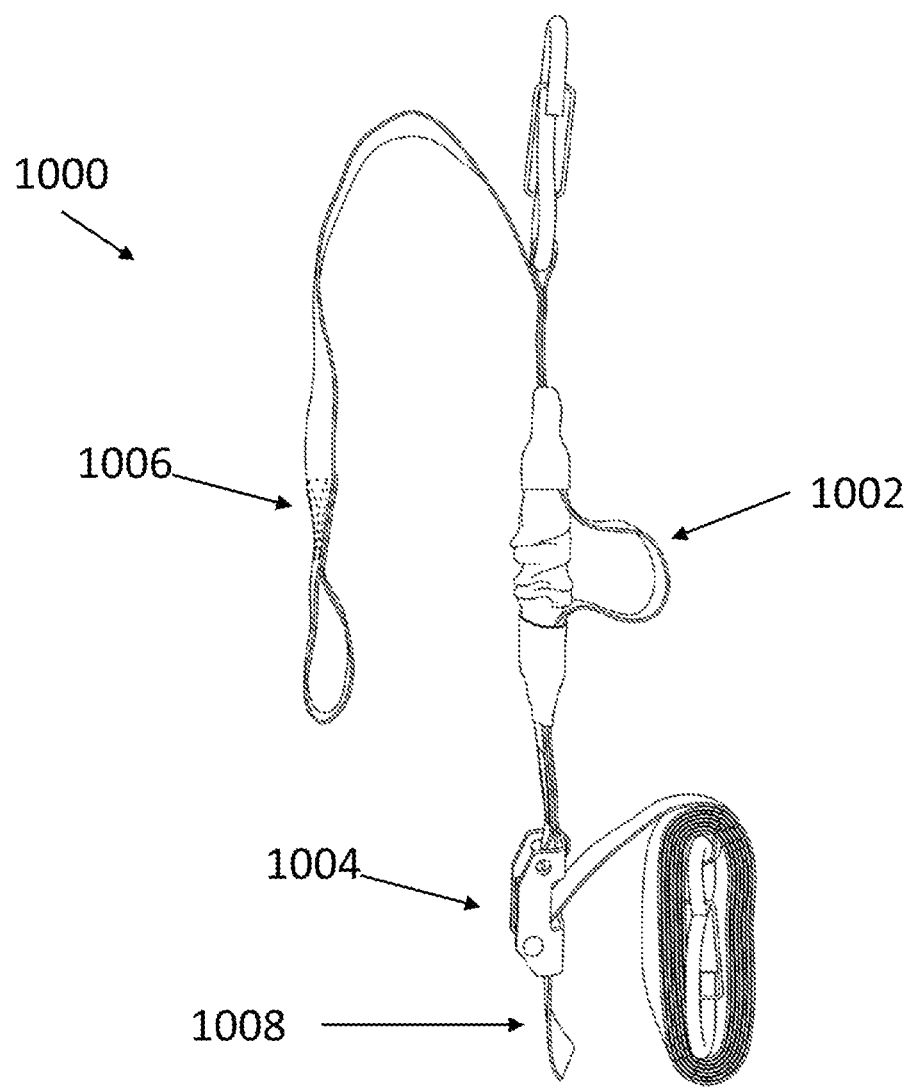
FIG. 10 illustrates a schematic diagram of assembled cargo strap tightening device, according to one or more embodiments illustrated herein.

FIG. 10 illustrates a schematic diagram of assembled cargo strap tightening device, according to one or more embodiments illustrated herein. In an embodiment, the cargo strap tightening device is assembled based on above-mentioned process. The assembled cargo strap tightening device as shown in FIG. 10 is final product with can be used to tighten the cargo for the transportation. The spring is attached with the strap webbing which causes a portion of the strap webbing to work as spring limiter 1002. The spring limiter 1002 is longer than the spring when the spring is not expanded. Further, the spring limiter prevents the spring from exceeding a maximum predetermined length in an event of over-flex condition. Further, the cargo strap tightening device comprises a cam-lock buckle coupled with the buckle assembly to provide mechanical advantage to tighten the spring. Furthermore, the strap webbing has a loose end 1008 for a user to pull the cargo strap tightening device to expand and tighten the spring. The strap webbing has a soft tie 1006 for fastening large or dedicated objects.

Figure 11:
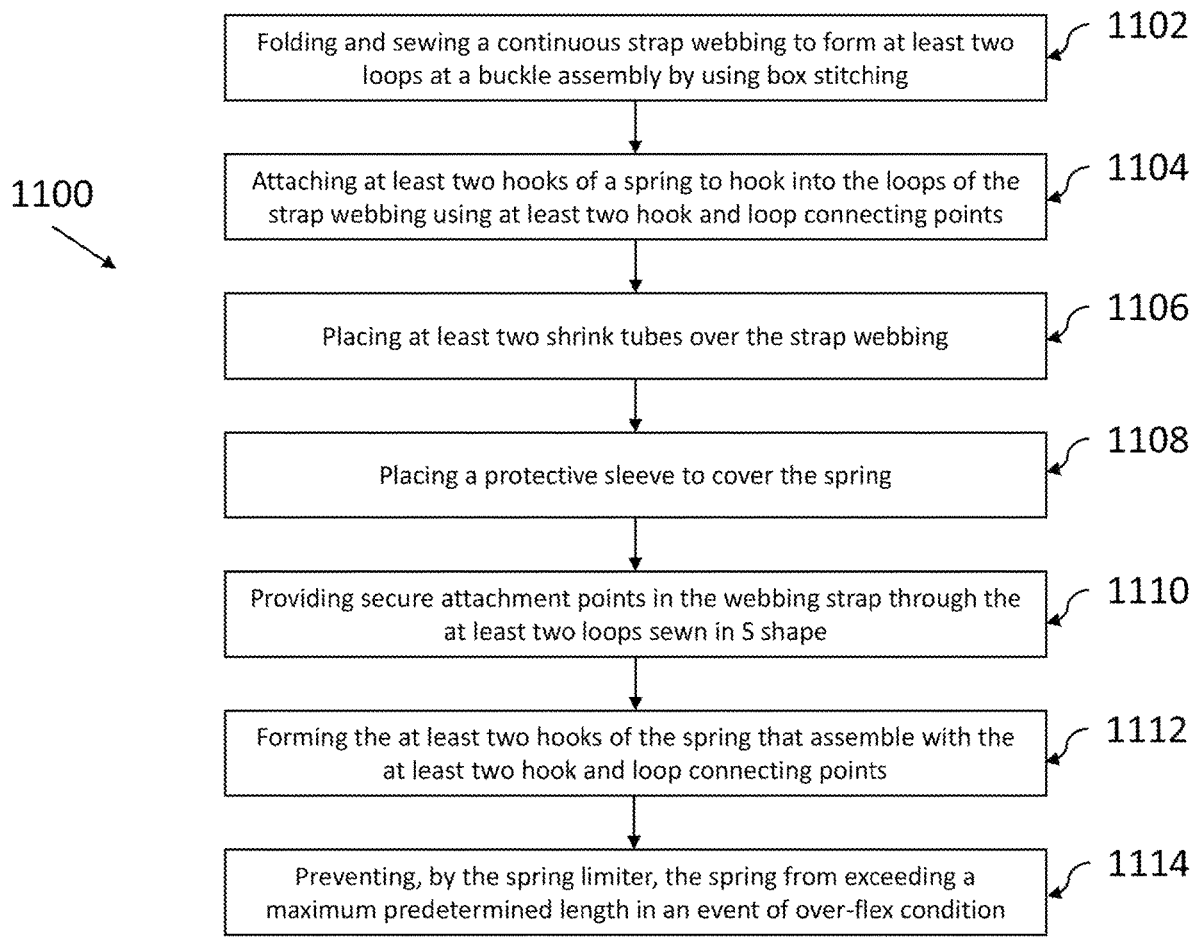
FIG. 11 illustrates a method for providing a means for tightening a cargo using a strap, according to one or more embodiments illustrated herein.

FIG. 11 is a flowchart illustrating example method steps of a method 1100 for providing a means for tightening a cargo using a strap.

At step 1102, the method 1100 comprises folding and sewing a continuous strap webbing to form at least two loops at a buckle assembly by using box stitching. At step 1104, the method 1100 comprises attaching at least two hooks of a spring to hook into the loops of the strap webbing using at least two hook and loop connecting points. At step 1106, the method 1100 comprises placing at least two shrink tubes over the strap webbing. The at least two shrink tubes are used to fasten the ends of the spring and the strap webbing when heat is applied on the shrink tubes.

At step 1108, the method 1100 comprises placing a protective sleeve to cover the spring. At step 1110, the method 1100 comprises providing secure attachment points in the webbing strap through the at least two loops sewn in S shape.

At step 1112, the method 1100 comprises forming the at least two hooks of the spring that assemble with the at least two hook and loop connecting points. At step 1114, the method 1100 comprises preventing, by the spring limiter, the spring from exceeding a maximum predetermined length in an event of over-flex condition.

Conventionally, ratchet straps are being used for tightening the cargo for transportation. Typical ratchet straps are difficult to use, and bungee cords are dangerous. The proposed invention eliminates danger and simplifies the tightening process into one simple step of pulling on the tail end of the strap. According to one or more above-mentioned embodiments, the cargo strap tightening device includes spring instead of ratchet straps. Thus, the process of manufacturing the cargo strap tightening device a very straight forward and more affordable. Therefore, the final product can be offered at a fairer retail price than the conventional devices which uses ratcheting device.

The Flexible portion of the strap consists of the steel spring with two hooked ends looping through the pre-stitched loop in the nylon webbing. After this attachment is made, a flexible portion has been established. A spring limiter is pre stitched into the nylon webbing in a way that prohibits the spring from overextending.

The combination of mechanical advantage buckle and spring allow for a method of tightening that only requires user to pull the tail end of tie-down. This design allows users who may not prefer ratcheting mechanisms an alternative method of tightening tie-down/cargo strap and does so with a very simplistic design that requires minimal moving parts, mechanical connections, and without significant weight.

Such a cargo strap would be used to easily tension down cargo into vehicles and vessels. Such a cargo straps could be used for outdoor equipment, sporting goods, construction tools, general merchandise and much more.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the embodiments as described herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A cargo strap tightening device, comprising:
   a buckle assembly that comprises a strap webbing;
   a spring having high tension, wherein each end of the spring being coupled to the buckle assembly;
   at least two hook and loop connecting points and at least two shrink tubes to fasten the buckle assembly, wherein the at least two shrink tubes are used to fasten the ends of the spring and the strap webbing when heat is applied on the shrink tubes; and
   a protective sleeve to cover the spring.

2. The cargo strap tightening device of claim 1, wherein the strap webbing is folded and sewn in an S shape to form at least two loops.

3. The cargo strap tightening device of claim 2, wherein the spring comprises a hook on each side of the spring, and wherein the hooks of the spring being attached into the loops of the strap webbing.

4. The cargo strap tightening device of claim 2, wherein the strap webbing has a loose end for a user to pull the cargo strap tightening device to expand and tighten the spring.

5. The cargo strap tightening device of claim 1, wherein the protective sleeve is comprised of nylon material or poly blend tubular textile to protect the spring.

6. The cargo strap tightening device of claim 1, wherein the at least two shrink tubes are shrunk around the hook and loop connection points to fasten the buckle assembly.

7. The cargo strap tightening device of claim 1, further comprising:
a cam-lock buckle coupled with the buckle assembly to provide mechanical advantage to tighten the spring.

8. The cargo strap tightening device of claim 1, wherein the spring is flexible and expandable to tighten the cargo.

9. The cargo strap tightening device of claim 1, wherein the buckle assembly does not comprise a ratcheting device to gain a tension to the cargo.

10. The cargo strap tightening device of claim 1, wherein the spring is attached with the strap webbing such that a portion of the strap webbing works as a spring limiter.

11. The cargo strap tightening device of claim 10, wherein the spring limiter is longer than the spring when the spring is not expanded.

12. The cargo strap tightening device of claim 11, wherein the spring limiter prevents the spring from exceeding a maximum predetermined length in an event of an over-flex condition.

13. A method for providing a means for tightening a cargo using a strap, comprising:
folding and sewing a continuous strap webbing to form at least two loops at a buckle assembly by using box stitching;
attaching at least two hooks of a spring to the loops of the strap webbing using at least two hook and loop connecting points;
placing at least two shrink tubes over the strap webbing, wherein the at least two shrink tubes are used to fasten the ends of the spring and the strap webbing when heat is applied on the shrink tubes; and
placing a protective sleeve to cover the spring.

14. The method of claim 13, further comprising:
providing secure attachment points in the webbing strap through the at least two loops sewn in an S shape; and
forming the at least two hooks of the spring that assemble with the at least two hook and loop connecting points.

15. The method of claim 13, wherein the at least two shrink tubes are placed to fasten the at least two hooks and the at least two loops without a mechanical device or coupling.

16. The method of claim 13, wherein the strap webbing has a loose end for a user to pull the cargo strap tightening means to expand and tighten the spring.

17. The method of claim 13, wherein the protective sleeve is comprised of nylon material or poly blend tubular textile to protect the spring.

18. The method of claim 13, wherein the spring is flexible and expandable to tighten the cargo.

19. The method of claim 13, wherein the spring is attached with the strap webbing such that a portion of the strap webbing works as a spring limiter, and wherein the spring limiter is longer than the spring when the spring is not expanded.

20. The method of claim 19, further comprising:
preventing, by the spring limiter, the spring from exceeding a maximum predetermined length in an event of over-flex condition.

* * * * *